(12) United States Patent
Kobayashi

(10) Patent No.: US 9,041,509 B2
(45) Date of Patent: May 26, 2015

(54) FACILITY MONITORING/CONTROLLING SYSTEM AND FACILITY MONITORING/CONTROLLING METHOD

(75) Inventor: Shouji Kobayashi, Kobe (JP)

(73) Assignee: ENECYBER CO. LTD., Kobe-shi, Hyogo (JP)

(*) Notice: Subject to any disclaimer, the term of this patent is extended or adjusted under 35 U.S.C. 154(b) by 1116 days.

(21) Appl. No.: 13/057,519

(22) PCT Filed: Aug. 5, 2009

(86) PCT No.: PCT/JP2009/064209
§ 371 (c)(1),
(2), (4) Date: Mar. 22, 2011

(87) PCT Pub. No.: WO2010/016610
PCT Pub. Date: Feb. 11, 2010

(65) Prior Publication Data
US 2011/0175701 A1    Jul. 21, 2011

(30) Foreign Application Priority Data

Aug. 5, 2008  (JP) ................ 2008-201640
Mar. 9, 2009  (JP) ................ 2009-054356

(51) Int. Cl.
*G05B 23/02* (2006.01)
*G05B 15/02* (2006.01)
(Continued)

(52) U.S. Cl.
CPC .............. *G05B 15/02* (2013.01); *H04N 21/482* (2013.01); *G06F 3/1431* (2013.01); *G06F 3/1454* (2013.01); *G06F 3/1423* (2013.01)

(58) Field of Classification Search
CPC ... G06F 3/1431; G06F 3/1454; G06F 3/1423; G06F 3/04842; G06F 3/0482; H04N 21/4314; H04N 21/482; H04N 5/4403; G06Q 50/01; G06Q 30/06; G06Q 20/12

USPC ........... 340/3.1, 3.7; 700/286, 287, 292, 293, 700/294, 297; 345/2.1, 2.2
See application file for complete search history.

(56) References Cited

U.S. PATENT DOCUMENTS 5,491,780 A * 2/1996 Fyles et al. ............ 715/733
5,659,692 A * 8/1997 Poggio et al. .......... 715/756
(Continued)

FOREIGN PATENT DOCUMENTS

JP         5-209816      8/1993
JP         6-236202      8/1994
(Continued)

*Primary Examiner* — Jennifer Mehmood
*Assistant Examiner* — Yong Hang Jiang
(74) *Attorney, Agent, or Firm* — Drinker Biddle & Reath LLP

(57) ABSTRACT

A facility monitoring/controlling system and method enabling provision of a screen display function having an adequate real-time property in the range of a low rate, e.g., around 64 kbps. An on-site facility monitoring/controlling subsystem (10) operates/controls a controlled facility (200) by an on-site input means (14) through an on-site manipulation screen means (30) showing the visualized operating state of the controlled facility (200). A center facility monitoring/controlling subsystem (20) reproduces/displays a remote manipulation screen (30') with the same contents as the on-site manipulation screen (30) on a center display means (22), and controls the controlled facility (200) by a center input means (23) and remotely operate/control the controlled facility (200). The site facility monitoring/controlling subsystem (10) extracts difference data by a difference data extraction unit (15) and performs data conversion using the analysis results of the periodicity of the change of the site manipulation screen (30) and analysis results of intermittence of the change of a cursor image from the difference data by a data conversion processing unit (19). The center facility monitoring/controlling subsystem (20) reversely converts the converted data by a manipulation screen reproducing/displaying processing unit, reproduces/displays the remote manipulation screen (30') on the center display means (22), and remotely operates/controls the controlled facility (200).

17 Claims, 9 Drawing Sheets

(51) Int. Cl.
  *G06F 3/14* (2006.01)
  *H04N 21/482* (2011.01)

(56) References Cited

U.S. PATENT DOCUMENTS

| | | | |
|---|---|---|---|
| 5,748,495 A * | 5/1998 | Arita et al. | 702/185 |
| 5,880,716 A * | 3/1999 | Kunugi | 345/173 |
| 2003/0154146 A1 * | 8/2003 | Muro et al. | 705/28 |

FOREIGN PATENT DOCUMENTS

| | | |
|---|---|---|
| JP | 10-124137 | 5/1996 |
| JP | 8-194524 | 7/1996 |
| JP | H11-15515 A | 1/1999 |
| JP | 11-069625 | 3/1999 |
| JP | 2000-039914 | 2/2000 |
| JP | 2000-167030 A | 6/2000 |
| JP | 2000-242327 | 9/2000 |
| JP | 2000-324567 | 11/2000 |
| JP | 2001-075626 A | 3/2001 |
| JP | 2001-268106 A | 9/2001 |
| JP | 2003-052083 | 2/2003 |
| JP | 2004-240746 | 8/2004 |
| JP | 2004-302990 | 10/2004 |
| JP | 2004-348605 A | 12/2004 |
| JP | 2005-293169 | 10/2005 |
| JP | 2005-339051 A | 12/2005 |
| JP | 2006-195681 | 7/2006 |
| JP | 2007-149070 | 6/2007 |
| JP | 2007-179526 | 7/2007 |
| JP | 2007-316744 | 12/2007 |
| JP | 2009-060304 | 3/2009 |

* cited by examiner

Fig.4

EXAMPLE OF FACILITY
DATA DISPLAY SCREEN CALL PROCEDURE

```
; CALL OF FACILITY SCREEN FROM MENU SCREEN
mouse move X1 Y1
mouse click l
;TAKING-OUT OF FACILITY DATA
get text ABC X2 Y2 W2 H2 N
write file ABC s
;RETURN TO MENU SCREEN
mouse move X3 3
mouse click l
end
```

EXAMPLE OF REGISTRATION OF
MANIPULATION PROCEDURE

EXAMPLE OF PROCEDURE FILE FOR CALLING
TARGET FACILITY SCREEN FROM MENU SCREEN,
AND TAKING OUT FACILITY STATE

X1,Y1: DISPLAY POSITION OF
        SYMBOL FOR CALLING FACILITY SCREEN

X2, Y2, W2, H2, N: DISPLAY POSITION, RANGE,
                   AND NUMBER OF DISPLAY
                   CHARACTER OF FACILITY 1 DATA s: SAVED FILE NAME OF FACILITY DATA

X3,Y3: DISPLAY POSITION OF
        SYMBOL FOR CALLING MENU SCREEN

Fig.6

EXAMPLE OF FACILITY
SETTING CONTROL EXECUTION PROCEDURE

```
; CALL SETTING CONTROL SCREEN FROM MENU SCREEN
mouse move X1 Y1
mouse click I
; CLICK SYMBOL MARK OF AIR CONDITIONER
mouse move X2 Y2
mouse click I
; INSTRUCTION FOR STARTING AIR CONDITIONER
mouse move X3 Y3
mouse click I
; INSTRUCTION FOR EXECUTING MANIPULATION OF AIR CONDITIONER
mouse move X4 Y4
mouse click I
; INSTRUCTION FOR RETURNING TO MENU SCREEN
mouse move X5 Y5
mouse click I
end
```

EXAMPLE OF REGISTRATION OF
MANIPULATION PROCEDURE

EXAMPLE OF PROCEDURE FILE FOR
CALLING TARGET FACILITY SCREEN, AND
PERFORMING SETTING CONTROL OF FACILITY STATE

X1,Y1: DISPLAY POSITION OF SYMBOL FOR
CALLING FACILITY SCREEN

X2,Y2: DISPLAY POSITION OF SYMBOL OF
AIR CONDITIONER

X3,Y3: DISPLAY POSITION OF SYMBOL FOR
STARTING AIR CONDITIONER

X4,Y4: DISPLAY POSITION OF SYMBOL FOR
EXECUTING MANIPULATION OF
AIR CONDITIONER

X5,Y5: DISPLAY POSITION OF SYMBOL FOR
CALLING MENU SCREEN

Fig.7

LIST OF COMMAND FUNCTION

| NO | COMMAND | FUNCTION |
|---|---|---|
| 1 | start file F | START PROCEDURE FILE F. |
| 2 | mouse move X Y | GENERATE MOVEMENT DATA FOR MOVING MOUSE CURSOR TO XY POSITION. |
| 3 | mouse click l | GENERATE MOUSE LEFT-CLICK MANIPULATION DATA. |
| 4 | mouse click r | GENERATE MOUSE RIGHT-CLICK MANIPULATION DATA. |
| 5 | put text abc N | GENERATE DATA FOR INPUTTING INITIAL N LETTERS OF CHARACTER (abc) WITH KEYBOARD. |
| 6 | get text abc X Y W H N | IMPORT N-LETTER IMAGE DISPLAY CHARACTER IN RANGE OF WIDE W AND HEIGHT H OF XY POSITION, AND CONVERT IT INTO TEXT DATA. STORE THE RESULT IN abc. |
| 7 | get status a X Y W H b | IMPORT IMAGE DATA IN RANGE OF WIDE W AND HEIGHT H OF XY POSITION, COMPARE IT WITH CONTENT OF IMAGE DATA FILE b, AND STORE THE RESULT IN a. IDENTICAL IMAGE: 1   DIFFERENT IMAGE: 0 |
| 8 | read file abc s | TAKE OUT CONTENT OF FILE s, AND STORE IT in abc. |
| 9 | write file abc s | STORE DATA abc IN FILE s. |
| 10 | wait t | DELAY EXECUTION FOR t SECOND |
| 11 | ID name | IDENTIFY TARGET EQUIPMENT BY NAME |
| 12 | end | END |

FACILITY MONITORING/CONTROLLING SYSTEM AND FACILITY MONITORING/CONTROLLING METHOD

TECHNICAL FIELD

The present invention relates to a facility monitoring/controlling system and a facility monitoring/controlling method which perform automatic operation of facilities for the purpose of energy saving etc., for various facilities including air-conditioning facilities and power-generating facilities in buildings.

Facilities to be monitored/controlled of the present invention are not particularly limited as long as they are plants, apparatuses, and machineries that have been arranged so as to be controllable by facility monitoring/controlling apparatuses, they are not limited by an energy-saving automatic operation method, either, and thus various facilities are applicable as facilities to be automatically operated.

BACKGROUND ART

In buildings and factories, there have been provided power plant facilities including air-conditioning facilities etc. that consume much energy, and private power generating facilities that generate electrical energy (hereinafter simply referred to as "facilities"). In recent years, it has been becoming social needs to implement measures for energy saving operation especially for the purpose of adjusting/reducing operating cost and carbon dioxide emissions.

For example, to take an air conditioner as an example, it has been generally known that an operating efficiency of the air conditioner is the best at rated load operation, and that it is reduced at a low load. Meanwhile, required heat energy, which is a heat load required for human living environment, changes depending on periods and time zones. Therefore, when pluralities of air conditioners are operated in a state of being arranged in parallel as seen in a number of buildings and factories, etc., there are many cases where an efficiency improves with a method that reduces the number of the air conditioners to be operated, and that operates the remaining air-conditioning facilities in a state near rated load to thereby be able to perform energy saving operation at a low heat load.

Cooling and heating are performed by air conditioners in a meeting place or the like where people gather together, and a fresh air is taken in to prevent insufficient oxygen in a room. Although $CO_2$ concentration changes with the number of people etc. here, a certain amount of air is generally taken in from an outside air in many cases. In addition, there is often a case where the certain amount of outside air is always taken in by assuming the largest capacities of the meeting place. It has been known that if an intake amount of the outside air is controlled so as not to increase a $CO_2$ concentration to not less than a prescribed value by monitoring the concentration in such the place, an operation efficiency of the air conditioner improves, and an energy saving effect can be expected.

In addition, loads of electrical facilities to which a private power generator supplies electrical energy also generally change largely depending on periods or time zones. When electrical loads become low, an efficiency of the power generator improves if the reduced number of electrical facilities is operated.

Further, an energy saving effect has also been known by controlling an amount of illumination on a ceiling according to an amount of solar radiation by the window.

As described above, there are many cases where energy saving operation can be achieved by operating facilities in a state of a high operating efficiency, or by stopping operation of unnecessary facilities. For this reason, more careful operation of the facilities has often been required for operators of the facilities.

Meanwhile, in these buildings and factories, an available maximum amount of power and maximum gas capacity are determined by power supply contracts, gas supply contracts, etc. in many cases. In such cases, when electric power etc. are used within a range of a contract capacity, a price per unit amount is relatively cheap, but once the contract capacity is exceeded, a penalty is imposed, and the price becomes high. Thus, a so-called total demand value, such as an amount of used power, is constantly monitored, and if a possibility of exceeding the contract capacity arises, a measure is taken for temporarily suppressing the total demand value by urgently stopping facilities with low work-related priorities and by suppressing output therefrom. It is also often well-known that saving of power rates can be achieved with such a method, as it is called, demand control. In this method, more careful operation of the facilities has often been required for operators of the facilities.

Recently, facility monitoring/controlling apparatuses (hereinafter referred to as "BEMS etc.") comprised of computers are often employed in a number of buildings and factories. The operator can perform state monitoring and operation manipulation of pluralities of facilities through screens of GUIs displayed by the BEMS etc.

The BEMS etc. introduced for maintenance operation of power plant facilities in buildings and factories, etc., have been focused on centrally monitoring the state of the facilities decentrally installed in a premise of the building or the factory, and on centrally manipulating the start or stop of the facilities at the beginning of the introduction, and it has become possible to perform monitoring manipulation of the on-site facilities by performing remote manipulation by the operator from a central control room provided in the premise, whereby a certain effect of energy saving has been exerted. Thus, the BEMS etc. have been introduced in a number of sites.

Here, various ingenuities are made to the screens of the GUIs on monitors of the BEMS etc. in order that the operator of the facilities exactly grasps operational state of the facilities to be monitored, and that operation of the facilities is made easier. For example, the operator is informed of the operational state of the individual facilities decentrally arranged in the premise, that is, operated/stopped state, temperatures, and consumed power of the facilities, and further a state of an apparatus for taking in an outside air, etc. by displaying them as unique symbols and numerical values, etc.

The operator confirms a state of facilities and numerical values, displayed on the screen of the GUI and then performs remote manipulation of the facilities. In addition, the operator performs click manipulation of the unique symbols displayed on the screen corresponding to the facilities by using an input device such as a mouse, and performs input manipulation of the numerical values and characters using the input device such as a keyboard, whereby start or stop of the facilities, change of operation target values, etc. are performed.

DISCLOSURE OF THE INVENTION

Technical Problem

As described above, although the BEMS etc. have often been employed in a number of buildings and factories in recent years, the operator just has to carefully manipulate the facilities with a manual input while determining the appropriate manipulation by himself in order to perform careful operation manipulation for achieving energy saving operation since functions held by the BEMS etc. are comparatively simple functions only, such as designation of start or stop of the facilities, and setting of the target values, such as temperatures and rotational frequencies as well as a function that displays the state of the facilities to inform the operator, thus requiring a high operation skill and much burden of the operator.

Consequently, in order to reduce the operator's burden and to always achieve the operation in an optimum state of the facilities, a function that automatically collects facility data, and a new mechanism that can execute automatic operation of the facilities have been required.

Although there is a method in which so-called high-performance BEMS etc. newly with an automatic operation function for optimum operation of the facilities is newly provided as for the mechanism for operating the facilities in a optimum state, introduction of the BEMS etc. is extremely unreal since it costs a lot and takes longer time to construct the apparatuses. Instead of this, a method is considered to effectively utilize the BEMS etc. that have already been introduced.

One of assumable mechanisms is the mechanism in which programs of the introduced BEMS etc. are changed, and an automatic collection function of the facility data or a target value setting function of the automatic operation of the facilities are additionally implemented. This mechanism has the following problems while there is an advantage in it that the existing apparatuses can be effectively utilized.

A first problem is that it becomes necessary to implement the new functions in addition to the individual BEMS etc. Since the functions of the BEMS apparatus are enhanced and an operationally proven program is reorganized, a work amount for reorganization increases, and it costs a lot in many cases. Thus, it is generally difficult to achieve this method except a particular case.

Particularly, even though there exists a system manufacturer that has the newest energy-saving operation controlling function, total demand suppressing/controlling function, or a technology thereof with respect to the existing BEMS etc., when the existing BEMS etc. provided in the buildings and the factories are made by different manufacturers, system design specifications do not match with each other, and thus it is difficult to introduce the functions or the technology. Namely, it is not easy for a software vender different from a software vendor of an existing monitoring/controlling program to easily incorporate new functions in the monitoring/controlling program of the existing BEMS etc. It is an actual condition that the mechanism has not been spread yet because of such a situation.

Consequently, generally, a method is performed in which the new automatic operation function is incorporated in another computer, and that the computer is connected to the existing BEMS etc. through a network etc. It is preferable to have a configuration to share the functions, with which current operational state and environmental conditions of the facilities are imported from the existing BEMS etc. to a computer to be newly provided to then cause the computer to determine the individual target operational state of the facilities for the optimum operation, and with which the existing BEMS etc. are made to manipulate the above-described facilities by using a facility monitoring/controlling function the existing BEMS etc. have already had. However, for the existing BEMS etc., there is required a work of additionally implementing a function for performing data exchange among the current condition data of the facilities, the environmental conditions, and the target operational state of the facilities, which thus causes much work cost to construct this system.

Namely, it is preferable that the automatic operation function of the computer to be newly provided is such that environmental conditions, such as the current operational state of the facilities and temperatures, can be input under common specifications, and the existing BEMS etc can be informed of the conditions under common specifications, as specific values like setting of start/stop of the apparatuses for the optimum operation of the facilities, or setting of a target temperature. Meanwhile, since many of the monitoring/controlling functions of the existing BEMS etc. that corporate with the automatic operation function have ready been operated under individual specifications in many cases, it is a reality that the functions are forced to be reorganized for achieving data cooperation with the new automatic operation function under the above-described common specifications in almost all cases, which thus requires much cost.

A second problem is that there is a case where qualities of the existing functions deteriorate by changing the introduced control program. Generally, in a monitoring/controlling apparatus, a phenomenon is found that there are many cases where a malfunction, that is to say, a bug exists at the time of completion of the program. Correction of the program is promoted along with the elapse of an operation time period, and it becomes stable after a certain time period. In this state, deterioration of the qualities is often caused due to reorganization of the existing functions accompanied with incorporation of the new automatic operation function.

A third problem is that a stop period of the apparatus is required with the change of the introduced control program. The existing functions are essential functions for operation of the facilities, and thus the operation stop period of the apparatus has to be as short as possible. However, since reorganization of the existing monitoring/controlling functions is required in order to additionally implement the new automatic operation function, a considerable stop period of the apparatus is unavoidable.

Solution to Problem

An object of the present invention is to provide a facility monitoring/controlling system and a facility monitoring/controlling method which automatically collect facility data and environmental data through the use of the existing BEMS etc., which can easily perform automatic manipulation of facility operation, and which can provide a mechanism for achieving energy-saving operation etc., by realizing an environment in which the BEMS etc. can easily be connected to each other under open specifications regardless of manufacturers' specifications or forms of the existing BEMS etc.

In order to achieve the above-described object, a facility monitoring/controlling system of the present invention includes: an on-site facility monitoring/controlling subsystem that includes on-site input means, on-site display means, and network communication means, and that controls operation of facility to be controlled through an on-site manipulation screen in which an operational state of the facility to be controlled is visualized on the on-site display means; and a center facility monitoring/controlling subsystem that includes center input means, center display means, and network communication means, transmits manipulation instruction data to the on-site facility monitoring/controlling subsystem through a remote manipulation screen as well as performing data transmission/reception to/from the on-site facility monitoring/controlling subsystem and reproducing/ displaying the remote manipulation screen with the same content as the on-site manipulation screen on the center display means, and that remotely controls the facility to be controlled, and in the facility monitoring/controlling system, the center facility monitoring/controlling subsystem automatically remotely manipulates the on-site facility monitoring/controlling subsystem, and includes automatic operation means of the facility to be controlled.

In order to appropriately perform automatic operation, in a configuration of the above-described facility monitoring/controlling system, it is preferable that the center facility monitoring/controlling subsystem includes a screen call procedure file storage unit that has stored a screen call procedure file indicating a transition procedure for calling each screen of the on-site manipulation screen and the remote manipulation screen, automatically manipulates the center input means by the automatic operation means automatically according to the screen call procedure file at a predetermined time or under a predetermined condition, communicates with the on-site facility monitoring/controlling subsystem, and thereby automatically operates the facility to be controlled.

In addition, in order to appropriately perform automatic operation, it is preferable that the center facility monitoring/controlling subsystem includes automatic data collection means that performs image recognition of the screen displayed on the remote manipulation screen to collect data, and automatically collects operation data of the facility to be controlled by the automatic data collection means based on the image displayed on the remote manipulation screen as well as displaying the operation data indicating the operational state of the facility to be controlled on the on-site manipulation screen of the on-site facility monitoring/controlling subsystem and on the remote manipulation screen of the center facility monitoring/controlling subsystem, by the automatic operation of the facility to be controlled by the automatic operation means through the remote manipulation screen.

Note that it is preferable to automatically collect environmental data in facility operation in addition to the operation data by the automatic data collection means.

In order to perform optimum operation through the above-described automatic operation, it is preferable that the automatic operation means includes optimum operation state calculation means that calculates an optimum operation state of the facility to be controlled based on the operation data of the facility to be controlled, and that the automatic operation means remotely manipulates the on-site facility monitoring/controlling subsystem to start or stop the facility to be controlled, or to change setting of operation conditions, and thus controls the facility to be controlled to be in the optimum operation state.

When the environmental data of the facility operation is also obtained by the automatic data collection means, the optimum operation state calculation means has only to calculate the optimum operation state by also using the environmental data.

In addition, in order to more appropriately perform automatic operation, it is preferable that the center facility monitoring/controlling subsystem includes a manipulation procedure file storage unit that has stored a manipulation procedure file indicating an operation manipulation procedure of the facility to be controlled, and that the automatic operation means automatically executes the operation of the facility to be controlled through the remote manipulation screen according to the manipulation procedure file when operating the facility to be controlled.

In addition, in order to more appropriately perform automatic operation, it is preferable that the center facility monitoring/controlling subsystem includes a planning file storage unit that has stored a planning file in which a changed content and a changed time of the operational state of the facility to be controlled is scheduled, and that the automatic operation means automatically changes the operational state of the facility to be controlled through the remote manipulation screen according to the planning file at a predetermined time.

Next, since it is preferable to perform operation control for suppressing an amount of used power within an amount of contracted receiving power in the operation of the facility to be controlled, in the facility monitoring/controlling system of the present invention, it is preferable that the center facility monitoring/controlling subsystem includes operation target value setting means that sets an operation target value for not exceeding a contracted amount calculated from a value of an amount of contracted maximum receiving power of the facility to be controlled, and that the automatic operation means remotely manipulates the on-site facility monitoring/controlling subsystem, operates or stops the facility to be controlled, or changes the setting of the operation condition, and controls the operation so that the consumed power due to the operation of the facility to be controlled is within the target value when consumed power in the operational state of the facility to be controlled exceeds or is assumed to exceed the target value as compared with the target value.

Note that it is preferable that data traffic is smaller between the on-site facility monitoring/controlling subsystem and the center facility monitoring/controlling subsystem in the facility monitoring/controlling system of the present invention. Consequently, the facility monitoring/controlling system of the present invention is provided with the following ingenuities.

First, there includes ingenuity with which the center facility monitoring/controlling subsystem has an image synthesis function of generating an image signal to be drawn on the remote manipulation screen to synthesize it on the remote manipulation screen according to a manipulation content of the center input means indicated in the screen call procedure file.

In addition, there includes ingenuity with which the automatic data collection means has a function of converting into coded data for logical operation a symbol image indicating the facility to be controlled displayed on the remote manipulation screen in a state of ON or OFF etc., to thereby collect the coded data.

In addition, there includes ingenuity with which the automatic data collection means has a function of converting into coded data for four arithmetic operations a numerical image indicating a state of the facility to be controlled displayed on the remote manipulation screen to then collect the coded data.

In addition, in order to reduce an amount of data transmission generated in an on-site facility monitoring/controlling subsystem, the on-site facility monitoring/controlling subsystem includes: a difference data extraction unit that analyzes a temporal change of image data forming the on-site manipulation screen to extract difference data; and a data conversion processing unit that performs data conversion processing using an analysis result that identifies change periodicity of the on-site manipulation screen and a moved position of the cursor image from the difference data, and transmits converted data after the data conversion by the network communication means, and the center facility monitoring/controlling subsystem includes a manipulation screen reproduction/display processing unit that reproduces/displays the remote manipulation screen and the cursor image on center display means based on the on-site manipulation screen data, and the converted data of the change periodicity of the image and the moved position of the cursor image transmitted from the on-site facility monitoring/controlling subsystem, whereby it becomes possible to reduce the amount of data transmission via the network.

It is to be noted that the on-site facility monitoring/controlling subsystem and the center facility monitoring/controlling subsystem may be installed in the same premise in the facility monitoring/controlling system of the present invention. Namely, in the facility monitoring/controlling system includes: the on-site facility monitoring/controlling subsystem that includes the on-site input means, the on-site display means, and the network communication means, and controls operation of the facility to be controlled through the on-site manipulation screen in a state where the operational state of the facility to be controlled is visualized on the on-site display means; and the center facility monitoring/controlling subsystem that includes the center input means, the center display means, and the network communication means, transmits manipulation instruction data to the on-site facility monitoring/controlling subsystem through the remote manipulation screen as well as performing data transmission/reception to/from the on-site facility monitoring/controlling subsystem and reproducing/displaying the remote manipulation screen with the same content as the on-site manipulation screen on the center display means, and that remotely controls the facility to be controlled, a configuration is possible such that the on-site facility monitoring/controlling subsystem, the center facility monitoring/controlling subsystem, and the network communication means are configured to be in the same apparatus, and that the monitoring/controlling subsystem automatically remotely manipulates the on-site facility monitoring/controlling subsystem, and includes the automatic operation means of the facility to be controlled.

It is to be noted that the facility monitoring/controlling system of the present invention can be provided by causing a computer system to read a remote monitoring/controlling program that can achieve the above-described remote monitoring/controlling function.

BRIEF DESCRIPTION OF THE DRAWINGS

FIG. 4 is a view briefly showing an example of a description content of a screen call procedure file;

FIG. 6 is a view briefly showing an example of a description content of a facility operation manipulation procedure file;

FIG. 7 is a list showing examples of commands that a center facility monitoring/controlling subsystem 20 can execute;

BEST MODES FOR CARRYING OUT THE INVENTION

Hereinafter will be described embodiments of a facility monitoring/controlling system and a facility monitoring/controlling method of the present invention with reference to drawings. However, it goes without saying that a scope of the present invention is not limited to specific applications, shapes, the number of components etc. that are described in the following embodiments.

First Embodiment

Figure 1:
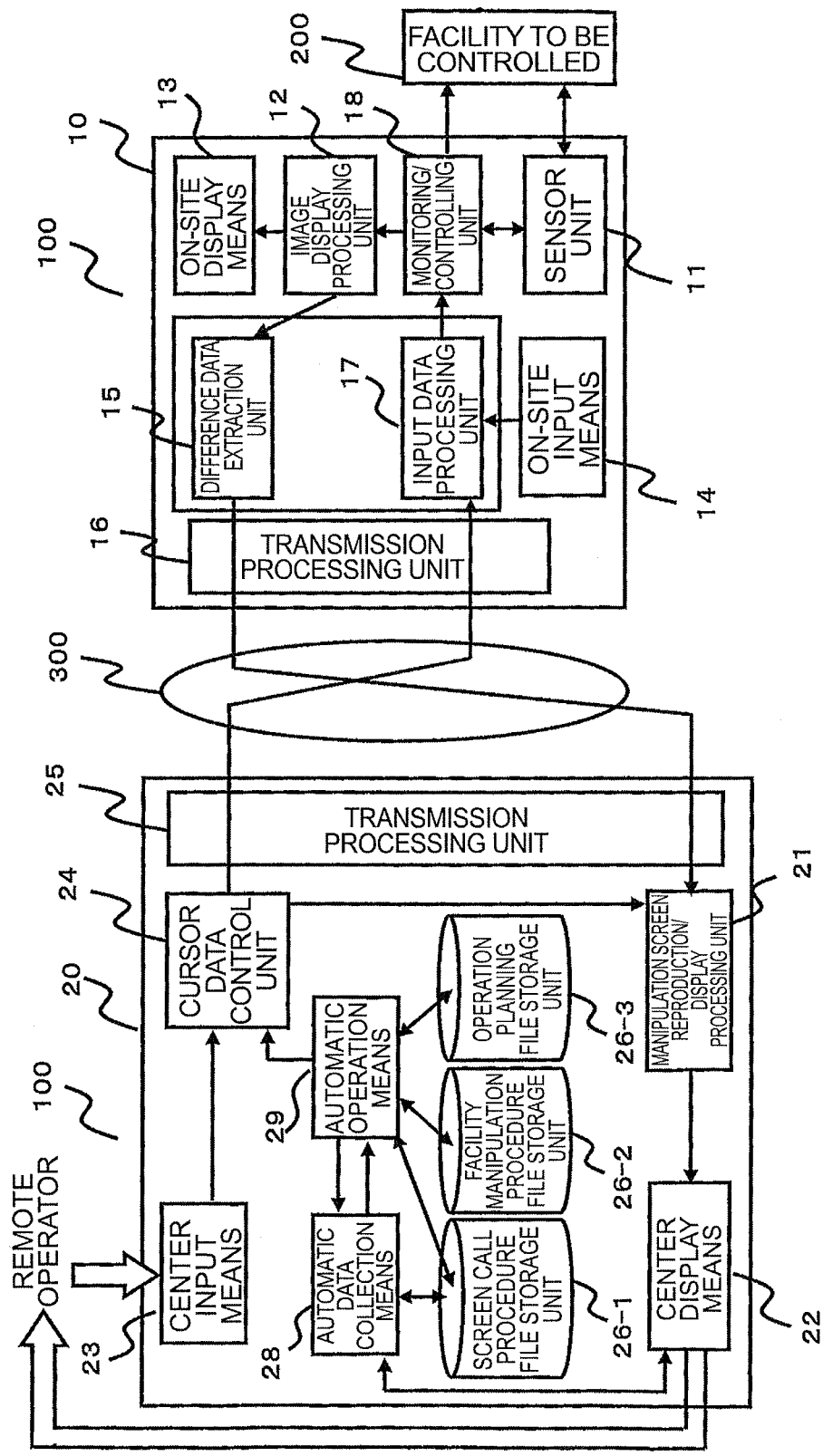
FIG. 1 is a diagram showing a configuration example of a facility monitoring/controlling system 100 according to a first embodiment of the present invention.

FIG. 1 is a diagram showing a configuration example of a facility monitoring/controlling system according to a first embodiment of the present invention. The configuration example in FIG. 1 will be described as an example in which a BEMS is applied to an air-conditioning facility in a building.

General BEMS etc. include in common: a function that displays on a screen of a GUI of a monitor as numerical values etc. symbols with which various current states of the facility including operated/stopped state of the facility can be grasped, and a temperature and a power consumption value of the facility to thereby inform an operator; and a function that performs start and stop, and change setting of an operation target value, etc. of the facility by the operator performing click manipulation of unique symbols corresponding to the facility displayed on the screen and by performing input manipulation of numerical values and characters using an input device, such as a keyboard.

With a remote monitoring/controlling system 100 according to the first embodiment of the present invention, even though facilities to be monitored are made by a number of manufacturers, respectively, i.e., in a multivendor environment, data held by each BEMS can be automatically collected without depending on configurations of existing BEMSs, manufacturers, and forms, and additionally, setting of target operation values of the facilities displayed by the BEMS can be automatically manipulated instead of a facility operator.

In the configuration example in FIG. 1, the remote monitoring/controlling system 100 includes an on-site facility monitoring/controlling subsystem 10 and a center facility monitoring/controlling subsystem 20.

The on-site facility monitoring/controlling subsystem 10 and the center facility monitoring/controlling subsystem 20 are connected to each other through a network 300.

Note that if both subsystems are connected to each other through the network 300, a physical distant relationship thereof is no object, and that the center facility monitoring/controlling subsystem 20, the on-site facility monitoring/controlling subsystem 10, and an installation place of the facility may be in the same premise, and they may be located in a physically separated remote place.

Furthermore, the center facility monitoring/controlling subsystem 20 and the on-site facility monitoring/controlling subsystem 10 may be constructed in the same computer. For example, this configuration is useful for a simulation or emulation about the BEMS in the multivendor environment, etc.

Although the center facility monitoring/controlling subsystem 20 is connected to the on-site facility monitoring/controlling subsystem 10 located at one place through the network 300 in FIG. 1, the remote monitoring/controlling system 100 may be configured by mounting a switching function such that the center facility monitoring/controlling subsystem 20 is connected to the on-site facility monitoring/controlling subsystems 10 located at a plurality of places through the network 300.

Facilities to be controlled 200 are not particularly limited, and the remote monitoring/controlling system 100 can be applied to various facilities, for example, power receiving facilities, air-conditioning facilities, and plants which are installed in buildings, factories, etc. Various sensors for detecting an operational state of the facility are incorporated in the remote monitoring/controlling system 100.

The network 300 is not particularly limited, and the center facility monitoring/controlling subsystem 20 may be connected to the on-site facility monitoring/controlling subsystem 10 through a private LAN, a wide area IP network, an IP network comprised of dial-up, or a mere hub etc.

The facility monitoring/controlling subsystem 10 corresponds to the BEMS etc. that control each facility to be controlled 200, and it monitors/controls an operational state of the facility to be controlled 200 through a facility manipulation screen.

The center facility monitoring/controlling subsystem 20 is the system arranged at a center side for operating the facility, and it monitors/controls the facility to be controlled 200 through the facility monitoring/controlling subsystem 10 as well as performing data transmission/reception to/from the facility monitoring/controlling subsystem 10 to thereby reproduce/display on center display means a manipulation screen with the same content as the facility manipulation screen.

Hereinafter, first, there will be described each component of the on-site facility monitoring/controlling subsystem 10 and each component of the center facility monitoring/controlling subsystem 20, and next, there will be sequentially specifically described an example of automatically collecting various data of the facility to be controlled 200, and an example of automatically manipulating the facility to be controlled 200.

(1) Description of Components of the on-Site Facility Monitoring/Controlling Subsystem 10

First, components of the on-site facility monitoring/controlling subsystem 10 will be described. The on-site facility monitoring/controlling subsystem 10 includes a sensor unit 11, an image display processing unit 12, on-site display means 13, on-site input means 14, a difference data extraction unit 15, a transmission processing unit 16, an input data processing unit 17, and a monitoring/controlling unit 18.

The sensor unit 11 is composed of various sensors arranged at the facility to be controlled 200 in order to obtain various data, such as the operational state of the facility to be controlled 200, and collects necessary various data from the facility to be controlled 200.

The image display processing unit 12 is the unit which performs image processing for visualizing a detection result of the operational state of the facility to be controlled 200 by the sensor unit 11, and which causes the on-site display means 13 to perform drawing processing. It is defined that here in the image display processing unit 12, movement of a mouse position and cursor image processing accompanied with the click manipulation are also performed by the on-site input means 14, which will be described hereinafter, and that drawing processing of the cursor image is also performed on the on-site display means 13.

The on-site display means 13 is the unit that displays the on-site manipulation screen 30 drawn by the image display processing unit 12. For example, it may be a liquid crystal monitoring device or the like.

Here, the on-site manipulation screen 30 is a graphical user interface provided to a manipulator in order to inform the manipulator of the operational state of the facility to be controlled 200, and to cause manipulator to input a control instruction content with respect to the facility to be controlled 200, and it can be various types of interfaces depending on the difference of the each facility to be controlled 200 and of software venders that provide on-site facility monitoring/controlling programs. A cursor image 31 is displayed in a superimposed state in the on-site manipulation screen 30.

Hereinafter, the components of the on-site facility monitoring/controlling subsystem 10 will be described by using the on-site manipulation screen 30, which is an example of a screen on which setting manipulation of an air conditioner is performed. The image display processing unit 12 outputs drawing data of the on-site manipulation screen 30 displayed on the on-site display means 13 to the on-site display means 13 and the difference data extraction unit 15 according to signals from the monitoring/controlling unit 18. It is to be noted that distribution of the image data is performed as follows: the signals are distributed by a signal distributor, which is not shown; one of the distributed signals is output to the on-site display means 13; and the other thereof is output to the difference data extraction unit 15.

Figure 2:
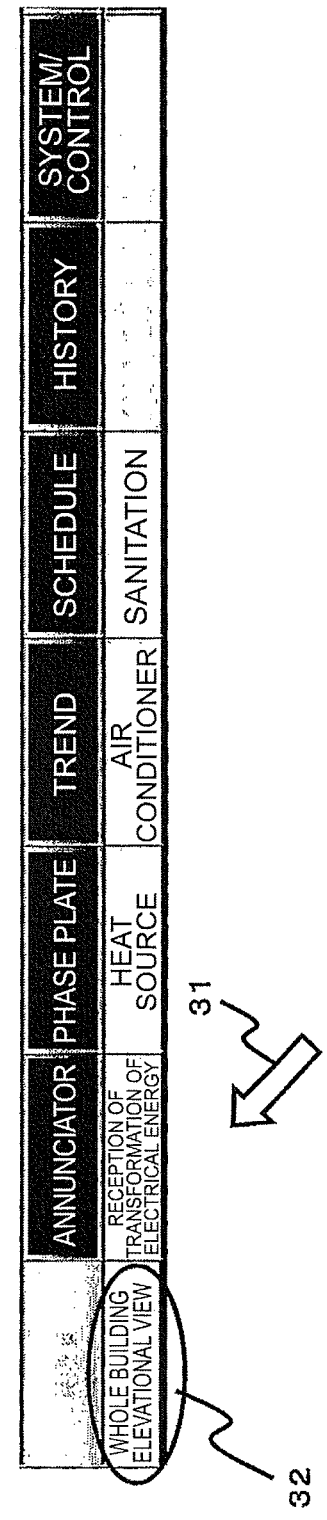
FIG. 2 is a view showing a display example of an on-site manipulation screen 30.

Although FIG. 2 shows one example of the on-site manipulation screen 30, it is not limited to the display example in FIG. 2. The example in FIG. 2 is the example in which an operational state of an air-conditioning facility and a menu of a screen for manipulating facility setting are displayed.

The on-site input means 14 may be a pointing device such as a mouse, keyboards, etc. Data input by the on-site input means 14 is output to the input data processing unit 17, which will be described hereinafter.

The difference data extraction unit 15 is the unit that analyzes a temporal change of the image data of the on-site manipulation screen 30 formed by the image display processing unit 12 to then extract difference data.

The transmission processing unit 16 is the unit that includes a data transmission/reception interface with respect to the network 300, and that transmits the difference data extracted by the difference data extraction unit 15. It is to be noted that although the difference data extraction unit 15 has a function for decreasing a transmission load of the network 300, under an environment where the network 300 has a sufficient transmission capacity, there is no problem without the difference data extraction unit 15.

The input data processing unit 17 treats input data input by a center manipulator with the center input means 23 in the same way as input data input by an on-site manipulator with the on-site input means 14, and includes: a function that receives the input data input from the on-site input means 14; and a function that reproduces manipulation input information with respect to the on-site manipulation screen 30 to receive it as pseudo input data from the on-site input means 14 of the on-site facility monitoring/controlling subsystem 10, and that outputs the data to the monitoring/controlling unit 18 based on remote control data transmitted from a cursor data control unit 24 of the center facility monitoring/controlling subsystem 20 as will be described hereinbelow.

The monitoring/controlling unit 18 is the unit that manages execution of the processing related to monitoring/control, and it may be an existing monitoring/controlling application software supplied for monitoring/controlling the facility to be controlled 200. The existing monitoring/control application of the facility to be controlled 200 may be produced by different manufacturers, i.e., may be in the multivendor environment, and thus it is not necessary to change the existing application.

The monitoring/controlling unit 18 executes monitoring/controlling processing for a call of a facility manipulation screen and for facility setting manipulation such as relay shift and switch shift, with respect to the facility to be controlled 200, by mouse manipulation data and keyboard manipulation data informed from the input data processing unit 17.

(2) Description of Components of the Center Facility Monitoring/Controlling Subsystem 20

Next, components of the center facility monitoring/controlling subsystem 20 will be described.

The center facility monitoring/controlling subsystem 20 is the system that transmits/receives data to/from the on-site facility monitoring/controlling subsystem 10 via the network 300, and that controls operation of the facility to be controlled 200 by a center input means 22 through a remote manipulation screen 30' as well as reproducing/displaying the remote manipulation screen 30' with the same content as the on-site manipulation screen 30 on the center display means 22.

The center facility monitoring/controlling subsystem 20 includes a manipulation screen reproduction/display processing unit 21, the center display means 22, the center input means 23, the cursor data control unit 24, a transmission processing unit 25, a screen call procedure file storage unit 26-1, a facility manipulation procedure file storage unit 26-2, an operation planning file storage unit 26-3, automatic data collection means 28, and automatic operation means 29.

The manipulation screen reproduction/display processing unit 21 is the unit that performs processing of reproducing/displaying the remote manipulation screen 30' and the cursor image on the center display means 22 by using a method of sequentially superimposing the image data based on the difference data transmitted from the monitoring/controlling subsystem 10.

The center display means 22 is the unit that displays the remote manipulation screen 30' drawn by the manipulation screen reproduction/display processing unit 21. For example, it may be a liquid crystal monitoring device or the like.

The remote manipulation screen 30' is the manipulation screen with the same content as the on-site manipulation screen 30, and it is a graphical user interface provided to the center manipulator who stays at a center in order to inform the center manipulator staying at the center of the operational state of the facility to be controlled 200, and to make him input a control instruction content with respect to the facility to be controlled 200, and it reproduces/displays the remote manipulation screen 30' with the same content as the on-site manipulation screen 30 whatever it may be. In addition, a cursor image 31' is displayed in the remote manipulation screen 30' in a superimposed state.

Figure 3:
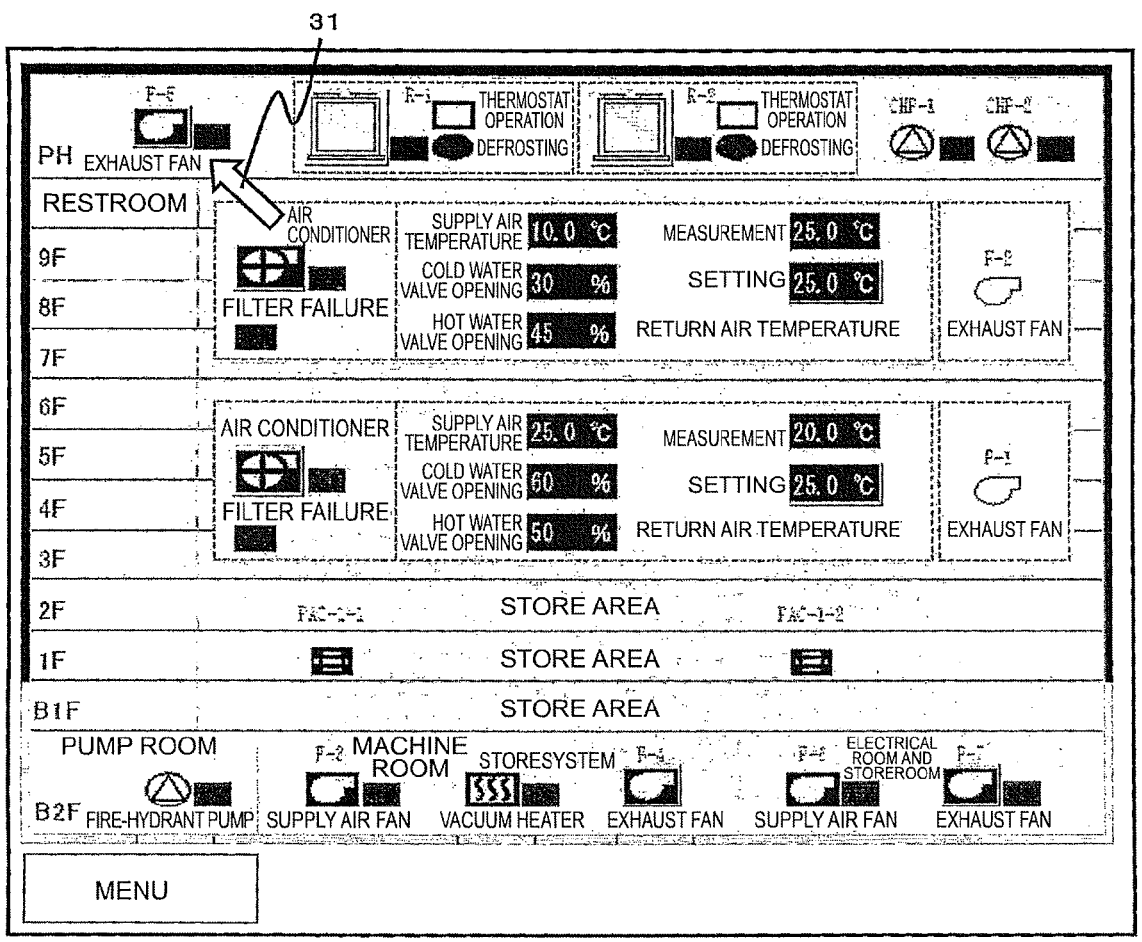
FIG. 3 is a view showing a facility manipulation screen of an air conditioner.

For example, when the on-site manipulation screen 30 is the one shown in FIG. 3, the remote manipulation screen 30' has the same content as the one in FIG. 3.

In addition, the center display means 22 may also be the one that can display a unique manipulation screen 30'' of the center facility monitoring/controlling subsystem 20 itself in addition to the remote manipulation screen 30' reproduced/displayed by the manipulation screen reproduction/display processing unit 21 on the center display means 22 of the center facility monitoring/controlling subsystem 20. A configuration is possible such that a monitor display is bisected to display pluralities of remote manipulation screens, for example, remote manipulation screens 30'*a* and 30'*b* of on-site facility monitoring/controlling subsystems 10*a* and 10*b* located at two places.

The center input means 23 may be, for example, a pointing device such as a mouse, or a keyboard. The cursor image 31' is displayed on the on-site display means 13 by the manipulation screen reproduction/display processing unit 21, and as described above, the center input means 23 informs the cursor data control unit 24 of mouse manipulation information, and the same image is displayed as this cursor image 31' as well as the image data, which is a result that a cursor state of the monitoring/control subsystem 10 has changed, being displayed on the on-site display means 13.

The cursor data control unit 24 is the unit that imports point data of the cursor image 31' transmitted from the on-site facility monitoring/controlling subsystem 10 and displayed by the manipulation screen reproduction/display processing unit 21, and that itself controls the point data as a cursor of the center input means 23. In addition, the cursor data control unit 24 is the unit that transmits movement point data given by the center input means 23 to the on-site facility monitoring/controlling subsystem 10 as will be described hereinbelow, and that gives movement point data related to a display position of the cursor image 31' to the manipulation screen reproduction/display processing unit 21.

The transmission processing unit 25 is the unit that includes the data transmission/reception interface with respect to the network 300, and that transmits manipulation data accompanied with the mouse manipulation and the keyboard manipulation by the cursor data control unit 24.

The screen call procedure file storage unit 26-1 is the unit that has stored a screen call procedure file indicating a mouse and keyboard manipulation procedure for calling each screen of the on-site manipulation screen 30 and the remote manipulation screen 30'. It is to be noted that this screen call procedure may be different depending on vendors of the BEMS or products of the BEMS, respectively.

The facility manipulation procedure file storage unit 26-2 is the unit that has stored a control procedure file of the BEMS, such as various setting procedures and change procedures for controlling the operation of the BEMS. It is to be noted that this facility control procedure may be different depending on the vendors of the BEMS or products of the BEMS, respectively.

The planning file storage unit 26-3 is the unit that has stored a planning file in which a changed content and a changed time of the operational state of the facility to be controlled 200 are scheduled. It is also possible for the manipulator etc. to dynamically rewrite this planning file in accordance with the needs of facility management.

The automatic data collection means 28 is the unit that performs image recognition of the screen displayed on the remote manipulation screen 30' to thereby collect data. For example, the automatic data collection means 28 is the unit that includes: a data display screen automatic display function that automatically starts at a predetermined time, calls a menu screen according to the screen call procedure file storage unit 26, next, clicks a symbol 32 on the screen, executes a procedure indicated in the screen call procedure file storage unit 26, and that automatically displays the remote manipulation screen 30' including the various data indicating the operational state of the facility to be controlled 200 through the remote manipulation screen 30'; and an image recognition function that automatically performs image recognition of the image of the remote manipulation screen 30', and that automatically collects the various data indicating the operational state of the facility to be controlled 200.

Namely, the automatic data collection means 28 automatically displays on the center display means 23 the remote manipulation screen 30' including the various data indicating the operational state of the facility to be controlled 200 by the automatic display function, and automatically performs image recognition of the image to automatically collect the various data indicating the operational state of the facility to be controlled 200.

In this example, the automatic data collection means 28 includes a logical operation code conversion function that converts into coded data for logical operation a symbol status image of the facility to be controlled 200 in the screen displayed on the remote manipulation screen 30', and that collects them.

In addition, in this example, the automatic data collection means 28 includes a four arithmetic operations code conversion function that converts into coded data for four arithmetic operations a numerical image indicating the state of the facility to be controlled 200 in the screen displayed on the remote manipulation screen 30', and that collects them.

As described above, the automatic data collection means 28 includes the logical operation code conversion function and the four arithmetic operations code conversion function, whereby mere image information is not obtained from the image, but data can be collected as logical data and numerical data required for operation control of the facility to be controlled 200.

Note that a starting condition of the automatic data collection means 28 is not limited to the above-described predetermined time, and that it is also considered to be a predetermined condition accompanied with occurrence of a condition in which manipulation of the facility is required, such as departure of the operation target value or occurrence of facility abnormality.

Next, the automatic operation means 29 determines an optimum operational state of the facility based on operation data and environmental data of the facility to be controlled 200, such as temperature and humidity, the data being collected by the automatic data collection means 28, extracts a procedure for transitioning to a state of the facility previously registered in a facility operation manipulation procedure file in order to transition from a current state to the optimum state of the facility, and executes the procedure on the remote manipulation screen 30' of the center display means 23, and then, the manipulation data is transmitted to Description of components of the on-site facility monitoring/controlling subsystem 10 through the network 300 to be mistakenly taken as a manipulation instruction on the on-site display means 13 of Description of components of the on-site facility monitoring/controlling subsystem 10, whereby the facility to be controlled 200 is controlled as if it is manipulated by the on-site manipulator.

For example, if a setting change GUI that appears on the manipulation screen for changing the operational state is the GUI on which a so-called up-and-down icon is displayed, and if the setting change GUI is the GUI on which a function for automatically clicking the up-and-down button icon and a column in which a set numerical value is input through the setting change GUI are displayed, a function for inputting a numerical value to be set in the column etc. are automatically executed by the automatic operation means 29.

Hereinafter, there will be described specific processing operations in which the above-described each unit cooperates with each other.

(3) An Example of Processing Operations of a Facility Automatic Operation System Hereinafter, there will be described an example of processing operations of a facility automatic operation system of the present invention. The facility to be controlled 200 is defined to be located at pluralities of places. As one example, a manipulation example will be described in which transition is performed from a GUI manipulation screen of an air-conditioning facility 1 located at one place to that of an air-conditioning facility 2 located at another place, and then data of the air-conditioning facility 2 is collected. An example will be described in which an automatic data collection function starts when a certain time T1 is reached, and automatically collects temperature data of a room where the air-conditioning facility 2 is in operation.

(3-1) Description of a Facility Data Collection Operation

It is first necessary to grasp operation data of the facility to be controlled 200 for automatic operation. Here will be described an operation for collecting data related to the operational state of the facility 200 from screens of the BEMS etc.

FIG. 2 shows a menu screen for calling a facility screen of the monitoring/controlling system 100. FIG. 3 shows a facility state a facility screen of an air conditioner. FIG. 4 is a view briefly showing an example of a description content of a screen call procedure file.

FIG. 7 is a list showing examples of commands a center facility monitoring/controlling subsystem 20 can execute. The screen call procedure file is described with commands the center facility monitoring/controlling subsystem 20 can execute.

[Procedure 1]

In the center facility monitoring/controlling subsystem 20, the automatic data collection means 28 is started at a constant frequency, a procedure file stored in the screen call procedure file storage unit 26 is repeatedly referred to at regular time intervals, and data indicating the operational state and the operational environment related to the facility 200 is automatically collected in cooperation with the monitoring/controlling subsystem 10 that manages the facility 200.

If the automatic data collection means 28 is started, the automatic data collection means 28 accesses the screen call procedure file storage unit 26, and read the description content of the procedure file.

It is to be noted that at this time, the remote manipulation screen 30' is in a state where the menu screen is displayed as shown in FIG. 2. A case is also considered where the most recently carried out-GUI manipulation screen of an air-conditioning facility (for example, the air-conditioning facility 1) remains, and the menu screen has not been displayed yet. In a case where the above-described situation occurs, it is better to add a manipulation procedure for calling the menu screen to a beginning of the procedure file.

[Procedure 2]

As shown in the second line of the procedure file in FIG. 4, a command "mouse move X1, Y1" is executed. As shown in the examples of the commands in FIG. 7, "mouse move X1, Y1" is the command for moving a position of a mouse pointer to (X1, Y1), and as shown in FIG. 2, a mouse pointer image moves onto the button 32 for calling the manipulation screen displayed as a "whole building elevational view" at the position (X1, Y1).

Movement of the mouse pointer is performed by the following mechanism.

The automatic data collection means 28 informs the input data processing unit 17 of the on-site facility monitoring/controlling subsystem 10 through the cursor data control unit 24 when the taken-out command is the "mouse move X1, Y1". In the input data processing unit 17, a mouse pointer icon displayed on the image of the on-site facility display means 13 is moved to the position (X1, Y1) using a method in which a difference is calculated between an informed target position of the mouse pointer movement and a position of the mouse pointer displayed on the current facility display means 13, a moving amount of the mouse in four directions is calculated to generate a movement signal, and the mouse movement signal is provided to a computer of the monitoring/control subsystem 10.

It is to be noted that the mouse movement signal described here is the same as a signal with which the on-site input means 14, such as the mouse, informs the computer of the monitoring/control subsystem 10 of the mouse movement.

A computer image of the on-site facility monitoring/controlling subsystem 10 is captured as a changed image of the mouse pointer by the image display processing unit 12. This image is displayed also on the center display means 22 through the difference data extraction unit 15 and the manipulation screen reproduction/display processing unit 21.

Next, as shown in the third line of the procedure file in FIG. 4, a command "mouse click 1" is executed.

Here, the mouse pointer icon image is moved to the position (X1, Y1), and the same effect can just be obtained as an effect of a left click of the mouse performed manually by the operator.

[Procedure 3]

As a result of carrying out the click of the button 32 for calling the manipulation screen displayed as the "whole building elevational view", the monitoring/controlling unit 18 accesses a facility (for example, the air-conditioning facility 2), and each data is detected by sensors (not shown) attached to the facility as shown in FIG. 3.

On the on-site manipulation screen 30, after predetermined data of the facility has been detected, the data is made to transition to the data display screen of the facility shown in FIG. 3 to be displayed as an image.

When transitioning to the data display screen on the on-site manipulation screen 30, data related to the transition image is transmitted to the center facility monitoring/controlling subsystem 20 through the network 300 via the difference data extraction unit 15 of the monitoring/controlling subsystem 10.

In the center controlling subsystem 20, a display screen is displayed on the center display means 22 as the center manipulation screen 30' shown in FIG. 3 through the manipulation screen reproduction/display processing unit 21.

[Procedure 4]

A next command in the procedure file is executed, image recognition of the data display screen of the facility (for example, the air-conditioning facility 2) is performed, and predetermined data is imported.

First, as shown in the fifth line of the procedure file in FIG. 4, a command "get text ABC X2 Y2 W2 H2 N" is executed. As shown in the examples of the commands in FIG. 7, "get text ABC X2 Y2 W2 H2 N" imports N image display characters in a range of width W dots and height H dots at an XY position, converts it into text data, and stores the converted result in a b c. The operator does not view and read required data from the data display screen, but actually, the operational state of the facility is obtained from the data display screen of the facility by the automatic image recognition function of the automatic data collection means 28, and then the state is stored in the file as text data.

Note that if the image is the symbol status image of the facility to be controlled in the data display screen displayed on the center manipulation screen, it is converted into coded data for logical operation to be collected, and if the image is the numerical image indicating the state of the facility to be controlled in the data display screen displayed on the remote manipulation screen, it is converted into numerical data to be collected.

Here, there is a case where data of a supply air temperature, a return air temperature, etc. of the facility is processed. Since these temperatures are numerical images, they are obtained as coded data for four arithmetic operations, that is, numerical data, as a result of automatic image recognition.

Here, as shown in FIG. 3, the supply air temperature, the return air temperature, etc. of the facility are obtained from the data display screen, which is the center manipulation screen 30' on the center display means 22, by the automatic data collection means 28, and they are stored in the file as text data.

[Procedure 5]

As shown in the eighth line of the procedure file in FIG. 4, a command "mouse move X3, Y3" is executed. As shown in the examples of the commands in FIG. 7, "mouse move X3, Y3" is a command for moving the position of the mouse pointer to (X3, Y3), and for example, in the example shown in FIG. 3, a position of a button symbol displayed as a "menu" is (X3, Y3), and the mouse pointer image moves onto the button symbol displayed as the "menu."

Next, as shown in the ninth line of the procedure file in FIG. 4, a command "mouse click 1" is executed.

Here, the mouse pointer icon image is moved to the position (X3, Y3), and the same effect can be obtained as the effect of the left click of the mouse performed manually by the operator. As a result of this, the menu screen shown in FIG. 2 is called.

As described above, even when the BEMS etc. are made by different vendors, and thus the procedures of the facility monitoring are different from each other, if the procedure is described in a form of the procedure file, necessary data of the facility to be monitored can be automatically collected by automatic manipulation whatever the procedure may be.

(3-2) Description of a Facility Setting Control Operation

Next, will be described an example of operation manipulation at the side of the center facility monitoring subsystem 20 in the monitoring/controlling system 100. As one example, an example will be described in which transition is performed from a GUI manipulation screen for selecting a manipulation menu (hereinafter referred to as a menu screen) to a GUI manipulation screen of an air-conditioning facility in a stopped state, and then manipulation for automatically starting operation of the air-conditioning facility is performed.

Since the operation for calling the facility manipulation screen from the menu screen is the same as in the "(3-1) Description of a facility data collection operation", it is omitted here.

FIG. 3 shows a facility manipulation screen of the monitoring/controlling system 100.

Figure 5:
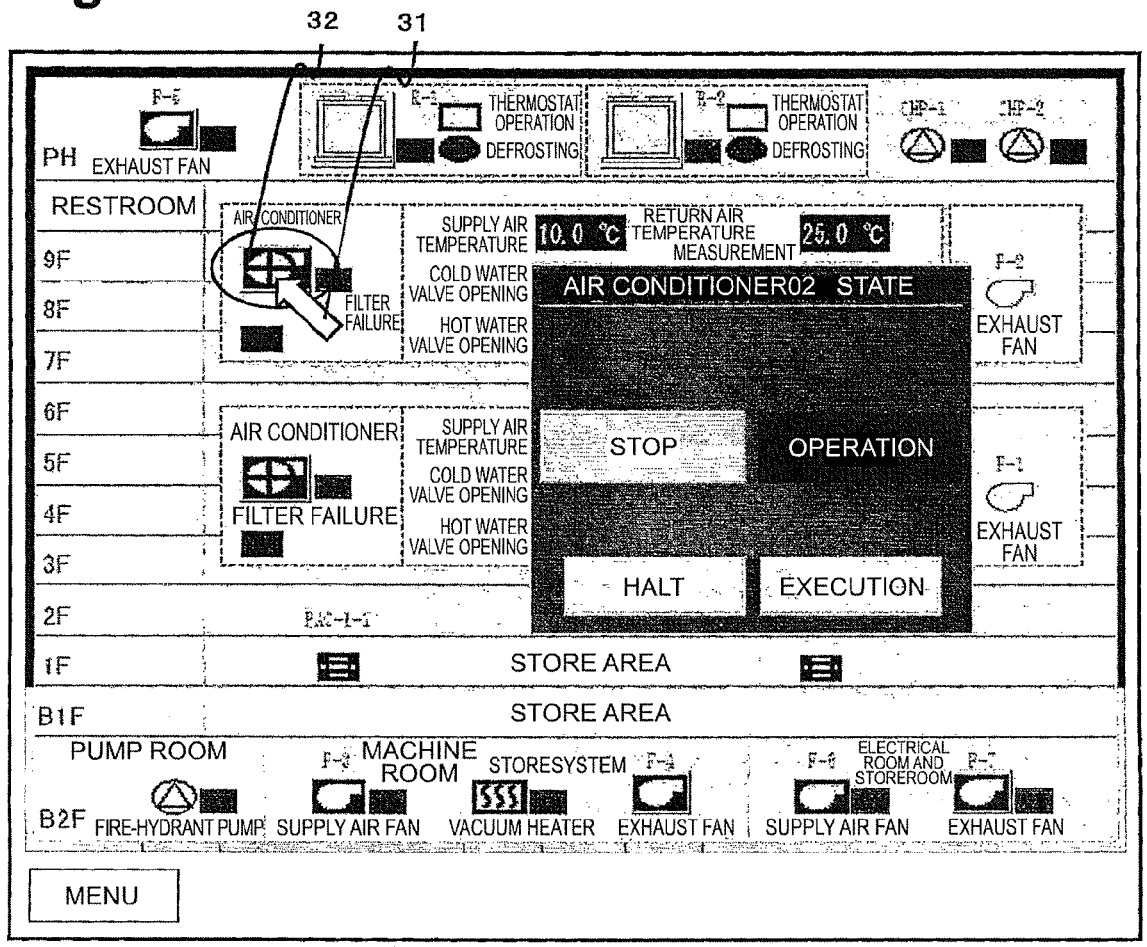
FIG. 5 is a view showing a screen to be used for changing an operational state of the air conditioner.

FIG. 5 shows a screen used for changing an operational state of the air conditioner.

FIG. 6 is a view briefly showing an example of a description content of a facility operation manipulation procedure file.

[Procedure 1]

If the automatic operation means 29 of the center facility monitoring/controlling subsystem 20 detects a certain environmental condition, and determines that it is necessary to start the air-conditioning facility in the stopped state, a facility operation manipulation procedure file 27 is referred to, and automatic manipulation is started.

Various things can be considered as objects whose environmental conditions are detected by the automatic operation means 29 of the center facility monitoring/controlling subsystem 20. For example, a case is included where starting operation of the air conditioners in the stopped state is required with the increase of heat load when some of pluralities of air-conditioning facilities are in the stopped state. Another case is also considered where the air-conditioning facilities in operation are stopped along with the decrease of the heat load.

When operational state data of the facility is required, the state of the facility can be collected by using the method in the above-described "(3-1) Description of a facility data collection operation". In addition, a case is also considered where the facility is started or stopped since a time determined in scheduled operation has arrived. Setting change of an operation target value of the facility, etc. may also be the object of the automatic operation manipulation without being limited to start or stop of the facility.

Here, it goes without saying that all the things are included as the objects as long as they are manipulation objects for setting control of the facility using the screens of the BEMS etc.

The automatic operation means 29 accesses the facility operation manipulation procedure file storage unit 27, and reads a description content of a manipulation procedure file.

[Procedure 2]

As shown in the second and third lines of the procedure file in FIG. 6, commands "mouse move X1, Y1" and "mouse click 1" are executed in that order, the on-site manipulation screen 30 is displayed on the on-site display means 13, and the center manipulation screen 30' is also displayed on the center display means 22.

A mechanism for executing the commands "mouse move X1, Y1" and "mouse click 1" is the same as the mechanism in the "(3-1) Description of a facility data collection operation", and thus they are omitted (the following procedures are also omitted).

[Procedure 3]

A command "mouse move X2, Y2" shown in the fifth line of the procedure file in FIG. 6 is executed. As shown in the examples of the commands in FIG. 7, "mouse move X2, Y2" is the command for moving the position of the mouse pointer to (X2, Y2), and the mouse pointer image moves onto a button symbol displayed as the "air-conditioning facility" at a position (X2, Y2) in FIG. 3.

As shown in the sixth line of the procedure file in FIG. 6, the command "mouse click 1" is executed. Here, the mouse pointer icon image is moved to the position (X2, Y2), and the same effect can just be obtained as the effect of the left click of the mouse performed manually by the operator.

As a result of this, a start/stop manipulation screen of the air-conditioning facility is displayed.

[Procedure 4]

A command "mouse move X3, Y3" shown in the eighth line of the procedure file in FIG. 6 is executed. As shown in the examples of the commands in FIG. 7, "mouse move X3, Y3" is the command for moving the position of the mouse pointer to (X3, Y3), and the mouse pointer image moves onto a button symbol displayed as "operation" at the position (X3, Y3).

As shown in the ninth line of the procedure file in FIG. 6, the command "mouse click 1" is executed. Here, the mouse pointer icon image is moved to the position (X3, Y3), and the same effect can just be obtained as the effect of the left click of the mouse performed manually by the operator.

As a result of this, the monitoring/controlling unit 18 is informed of starting preparation of the air-conditioning facility, and the preparation for enabling the start of the apparatus is performed by an execution instruction.

[Procedure 5]

A command "mouse move X4, Y4" shown in the eleventh line of the procedure file in FIG. 6 is executed. As shown in the examples of the commands in FIG. 7, "mouse move X4, Y4" is the command for moving the position of the mouse pointer to (X4, Y4), and the mouse pointer image moves onto a button symbol displayed as "execution" at a position (X4, Y4).

As shown in the twelfth line of the procedure file in FIG. 6, the command "mouse click 1" is executed. Here, the mouse pointer icon image is moved to the position (X4, Y4), and the same effect can just be obtained as the effect of the left click of the mouse performed manually by the operator.

As a result of this, the monitoring/controlling unit 18 is informed of data of the start of the air-conditioning facility, and start of the facility to be controlled 200 is started.

As described above, even when the BEMS etc. are made by different vendors, and thus the procedures of the facility monitoring are different from each other, if the procedure is described in the form of the procedure file, necessary setting manipulation of the facility to be monitored can be automatically executed by automatic manipulation whatever the procedure may be.

Although automatic manipulation has been described by using the method in which the procedure file is previously prepared in the above, a method is also naturally considered in which the procedure file is automatically generated by the automatic operation means 29.

Second Embodiment

A configuration of a facility monitoring/controlling system 100*a* according to a second embodiment of the present invention will be shown.

Figure 8:
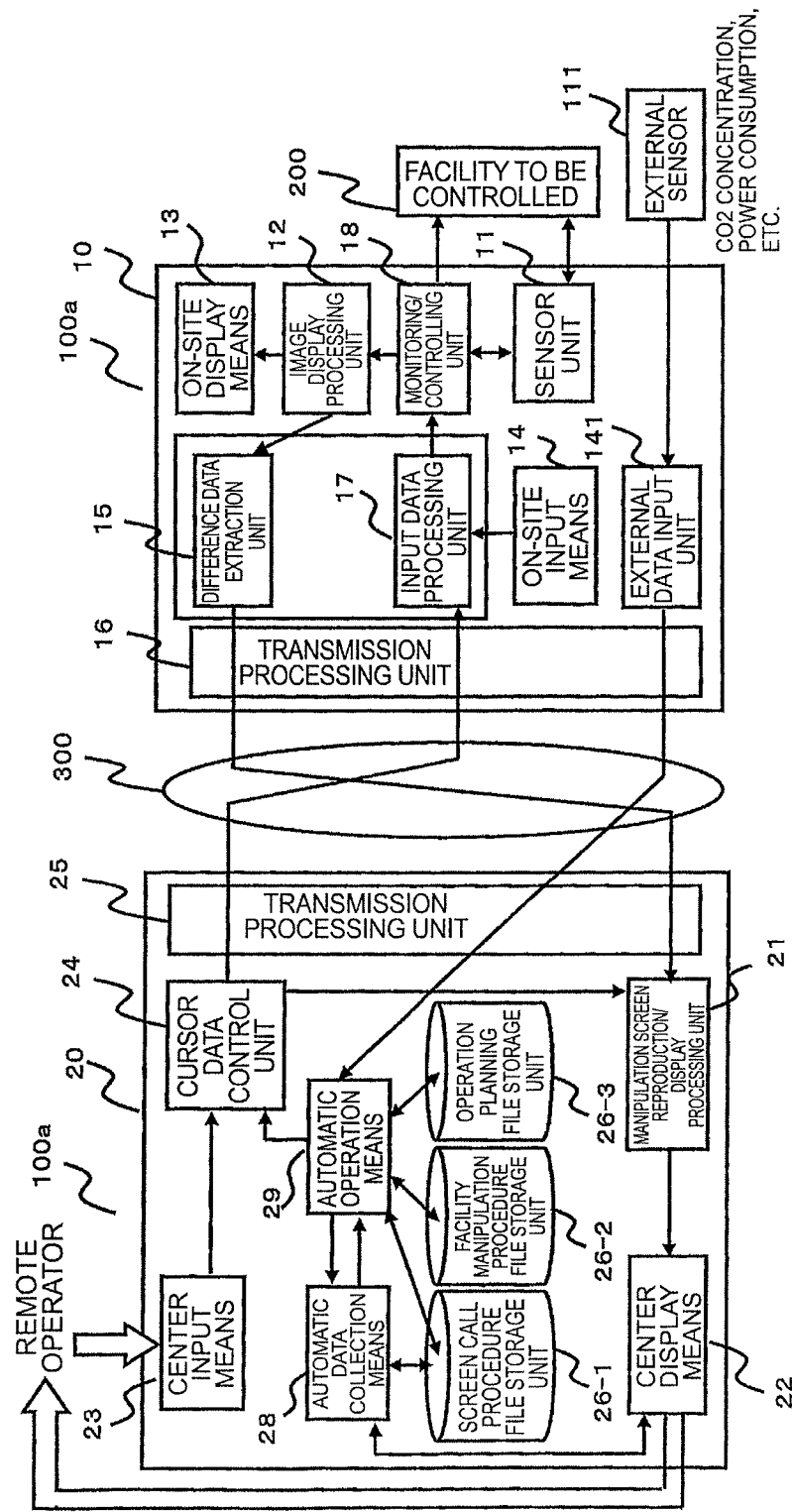
FIG. 8 is a diagram showing a configuration example of a facility monitoring/controlling system 100a according to a second embodiment of the present invention.

FIG. 8 is a diagram showing a configuration example of the facility monitoring/controlling system 100*a* according to the second embodiment of the present invention, and it is the diagram in which an external data input unit 141 and an external sensor 111 are added based on the configuration in FIG. 1 shown in the first embodiment. The configuration is provided with a function where data indicating the state of the facility detected by the external sensor 111 and data indicating the state of environment are imported from the external data input unit 141 to inform the automatic operation means 29.

In the automatic operation means 29, when the informed data of the various sensors has already exceeded a previously stored reference value, or when presence/absence of a possibility that the data exceeds the value within a certain time period is calculated, and then the data has already exceeded the value or there is the possibility of exceeding it, a facility transition procedure for manipulating the change of the optimum state of the facility, etc. is generated.

For example, a concentration measuring apparatus of $CO_2$ can be considered as the external sensor 111. In the automatic operation means 29, when $CO_2$ concentration exceeds a certain value, for example, 1000 ppm, or when there is a possibility of exceeding it, a procedure is extracted in which an opening of an outside air intake apparatus of the air-conditioning facility is increased to thereby take in more outside air. If reduction of $CO_2$ concentration is detected, a procedure for suppressing outside air intake, which is an opposite manipulation of the above, is extracted.

In addition, an illuminance measuring apparatus installed by the window is also considered as the external sensor 111. A manipulation procedure for controlling an illuminating device by the window is extracted by the automatic operation means 29.

Here, the automatic operation means 29 may be the same as the one in the first embodiment except that it generates the procedure for transitioning to the optimum state of the facility based on the informed detection data of the external sensor 111.

It is to be noted that a receiving power meter can also be used as the external sensor 111. In this case, an amount of power measured by the receiving power meter is imported by the external data input unit 141, and the automatic operation means 29 is informed of the amount of power.

In the automatic operation means 29, when the informed amount of the receiving power has already exceeded a previously stored reference value, or when presence/absence of a possibility that the amount exceeds the value within a certain time period is calculated, and then the amount has already exceeded the value or there is the possibility of exceeding it, a facility transition procedure for performing manipulation such as the stop of a previously selected facility, or the change of temperature setting of the air conditioner is generated.

Here, all may be the same as the first embodiment except that the automatic operation means 29 generates the procedure for transitioning to the optimum state of the facility based on the informed amount of the receiving power.

Third Embodiment

As a third embodiment, there will be described incorporating ingenuity that includes a data conversion processing unit 19 and that thereby reduces an amount of data transmission performed between the on-site facility monitoring/controlling subsystem 10 and the center facility monitoring/controlling subsystem 20. Namely, changes of the on-site manipulation screen of the on-site facility monitoring/controlling subsystem 10 is not transmitted only as image data, but when the change of the image is known, or when it can be patterned, an amount of data transmission is reduced by converting the change of the image into code information indicating the change to then transmit it.

As a manipulation example, there will be described a specific example of data transmission that is performed between the on-site facility monitoring/controlling subsystem 10 and the center facility monitoring/controlling subsystem 20 through the network 300 in the facility monitoring/controlling system 100 according to a embodiment of the present invention when an abnormality occurs in the facility to be controlled 200, and movement such as flicker occurs as a warning thereof on the on-site manipulation screen 30.

Figure 9:
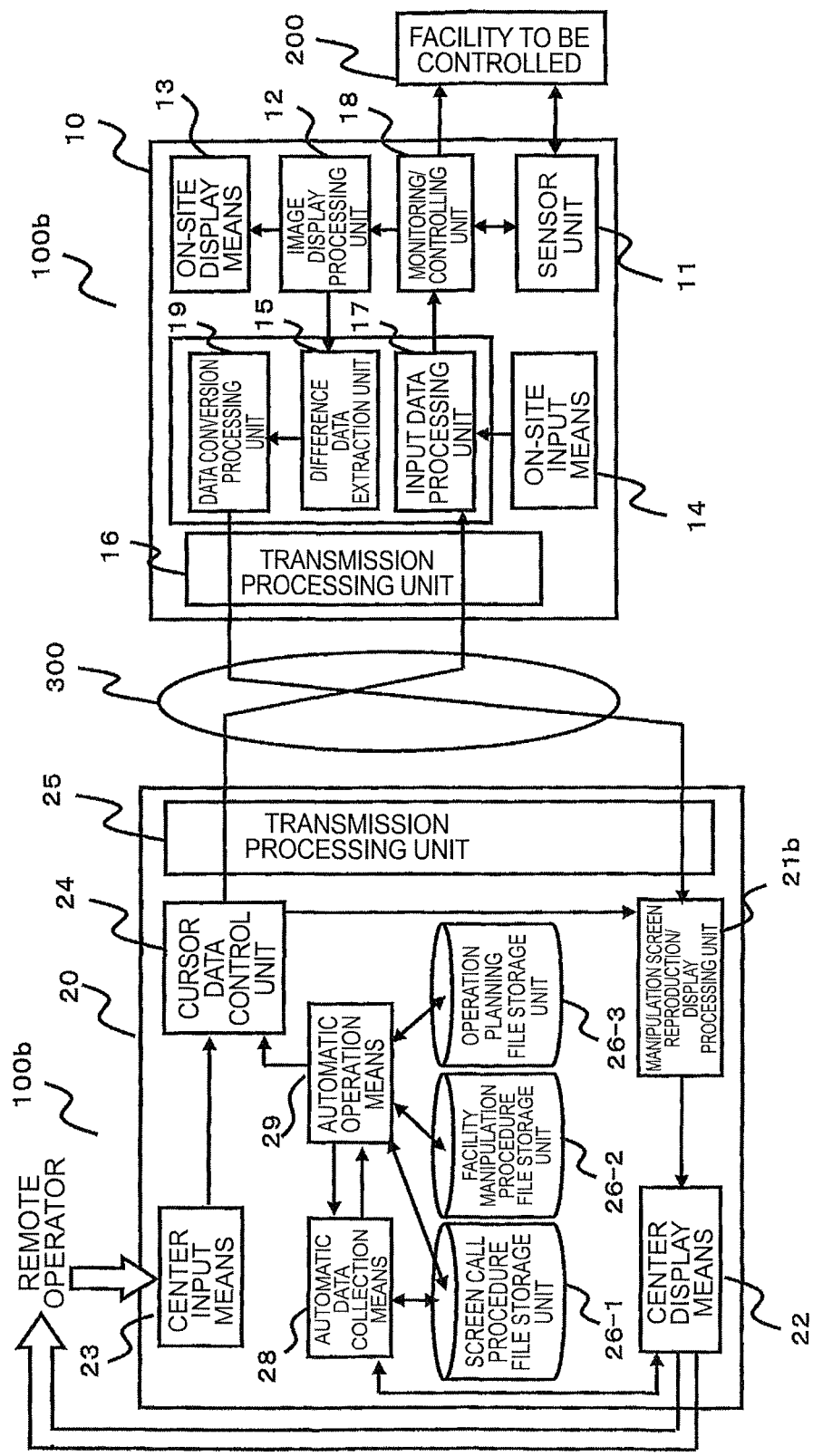
FIG. 9 is a diagram showing a configuration example of a facility monitoring/controlling system 100b according to a third embodiment of the present invention.

FIG. 9 is a diagram showing a configuration example of a facility monitoring/controlling system 100b according to a third embodiment of the present invention. In the configuration, the data conversion processing 19 is added based on the configuration example in FIG. 1 of the first embodiment, and a manipulation screen reproduction/display processing unit 21b includes a reverse conversion function of the code information as will be described hereinbelow.

The data conversion processing unit 19 is the unit that performs data conversion processing using analysis results of periodicity of the change of the on-site manipulation screen 30 and analysis results of intermittence of the change of the cursor image from a difference data group extracted by the difference data extraction unit 15. The data conversion processing unit 19 includes a conversion table so that data conversion processing can be performed from the difference data group, and efficiently converts the difference data group into a short data set, coded data, etc. by referring to the conversion table.

In the conversion table, for example, included are: a flicker code conversion table that converts into a flicker code a difference data group caused by occurrence of the flicker on the on-site manipulation screen 30; a pull-down menu code conversion table that converts into a pull-down menu code a difference data group caused by expansion or erasure of the pull-down menu on the on-site manipulation screen; a message code conversion table that converts into a message code a difference data group caused by display of a message, such as a streaming characters on the on-site manipulation screen; a guidance code conversion table that converts into a guidance code a difference data group caused by display of a guidance or an on-line manual on the on-site manipulation screen; etc.

In the third embodiment of the present invention, the manipulation screen reproduction/display processing unit 21b performs reproduction/display processing of the remote manipulation screen 30' and the cursor image on the center display means 22 based on the converted data transmitted from the on-site facility monitoring/controlling subsystem 10 in addition to the on-site manipulation screen data. Here, as for the data (an initial screen, various buttons, various pull-downs menus, various messages, etc.) on the on-site manipulation screen 30, it is preferable to hold/store the on-site manipulation screen data previously employed by the on-site facility monitoring/controlling subsystem 10 in the center facility monitoring/controlling subsystem 20. This is because the amount of data transmitted through the network 300 can be reduced by previously holding/storing the on-site manipulation screen data at a center facility monitoring/controlling system 20 side as described above.

In addition, when the data converted through the on-site data conversion processing unit 19 is coded, it is necessary for the manipulation screen reproduction/display processing unit 21b to include the reverse conversion table so that contents and movements to be displayed can be reproduced from these coded data etc. The contents to be displayed are efficiently reproduced from the short data set, the coded data, etc. by referring to the reverse conversion table.

For example, corresponding to the above, there are: a flicker code reverse conversion table that reversely converts a flicker code into flicker information indicating a flicker content on the remote manipulation screen; a pull-down menu code reverse conversion table that reversely converted a pull-down menu code into pull-down menu information on the remote manipulation screen; a message code reverse conversion table that reversely converts a message code into message display information, such as the streaming characters on the remote manipulation screen; a guidance code reverse conversion table that reversely converts a guidance code into guidance information and on-line manual information on the remote manipulation screen; etc.

As described above, in the change of the image generated on the on-site manipulation screen 30 or the remote manipulation screen top 30' caused by manipulation, the change of the image is converted into the code information indicating the difference data, or into the code information indicating a change pattern, and only this short code information is only transmitted/received on the network 300, whereby facility monitoring/control can be executed.

In the above embodiments, the facility monitoring/controlling system and the facility monitoring/controlling method of the present invention have been described, and even when the BEMS etc. are made by different vendors, and thus the procedures of the facility target value setting are different from each other, if the procedure is described in the form of the planning file and the screen call procedure file, necessary target value setting of the facility to be monitored can be automatically changed by automatic manipulation whatever the procedure may be.

As described above, preferred embodiments of the present invention have been depicted and described, and it will be understood that various changes can be performed without departing from a technical scope of the present invention.

Thus, the technical scope of the present invention is limited only by description of the appended claims.

INDUSTRIAL APPLICABILITY

As described above, the preferred embodiments of the present invention have been depicted and described, and the facility monitoring/controlling system of the present invention can be applied to remote monitoring/controlling application of various facilities and plants.

The invention claimed is:

1. A facility monitoring/controlling system comprising:
an on-site facility monitoring/controlling subsystem that includes on-site input means, on-site display means, and network communication means, and that controls operation of a facility to be controlled through an on-site manipulation screen in which an operational state of the facility to be controlled is visualized on the on-site display means; and
a center facility monitoring/controlling subsystem that includes center input means, center display means, and network communication means, transmits manipulation instruction data to the on-site facility monitoring/controlling subsystem through a remote manipulation screen as well as performing data transmission/reception to/from the on-site facility monitoring/controlling subsystem and reproducing/displaying the remote manipulation screen with the same content as the on-site manipulation screen on the center display means, and that remotely controls the facility to be controlled; wherein
the center facility monitoring/controlling subsystem automatically remotely manipulates the on-site facility monitoring/controlling subsystem, and includes automatic operation means of the facility to be controlled, and wherein
the center facility monitoring/controlling subsystem includes an automatic data collection device that performs image recognition of image information that is displayed on the remote manipulation screen to collect data, and automatically collects operation data of the facility to be controlled by the automatic data collection device based on the image displayed on the remote manipulation screen as well as displaying the operation data indicating the operational state of the facility to be controlled on the on-site manipulation screen of the on-site facility monitoring/controlling subsystem and on the remote manipulation screen of the center facility monitoring/controlling subsystem, by the automatic operation of the facility to be controlled by the automatic operation means through the remote manipulation screen.

2. The facility monitoring/controlling system according to claim 1, wherein the center facility monitoring/controlling subsystem includes a screen call procedure file storage unit that has stored a screen call procedure file indicating a transition procedure for calling each screen of the on-site manipulation screen and the remote manipulation screen, automatically manipulates the center input means by the automatic operation means automatically according to the screen call procedure file at a predetermined time or under a predetermined condition, communicates with the on-site facility monitoring/controlling subsystem, and thereby automatically operates the facility to be controlled.

3. The facility monitoring/controlling system according to claim 1, wherein by the automatic operation of the facility to be controlled by the automatic operation means through the remote manipulation screen, the operation data indicating the operational state of the facility to be controlled and environmental data related to facility operation are displayed on the on-site manipulation screen of the on-site facility monitoring/controlling subsystem and on the remote manipulation screen of the center facility monitoring/controlling subsystem, and the operation data of the facility to be controlled and the environmental data of the facility to be controlled are automatically collected by the automatic data collection device based on an image displayed on the remote manipulation screen.

4. The facility monitoring/controlling system according to claim 1, wherein the automatic operation means includes optimum operation state calculation means that calculates an optimum operation state of the facility to be controlled based on the operation data of the facility to be controlled, and the automatic operation means remotely manipulates the on-site facility monitoring/controlling subsystem to start or stop the facility to be controlled, or to change setting of operation conditions, and thus controls the facility to be controlled to be in the optimum operation state.

5. The facility monitoring/controlling system according to claim 3, wherein the automatic operation means includes optimum operation state calculation means that calculates the optimum operation state of the facility to be controlled based on the operation data of the facility to be controlled and the environmental data of the facility to be controlled, and the automatic operation means remotely manipulates the on-site facility monitoring/controlling subsystem to start or stop the facility to be controlled, or to change setting of the operation conditions, and thus controls the facility to be controlled to be in the optimum operation state.

6. The facility monitoring/controlling system according to claim 1, wherein the center facility monitoring/controlling subsystem includes a manipulation procedure file storage unit that has stored a manipulation procedure file indicating an operation manipulation procedure of the facility to be controlled, and the automatic operation means automatically executes the operation of the facility to be controlled through the remote manipulation screen according to the manipulation procedure file when operating the facility to be controlled.

7. The facility monitoring/controlling system according to claim 1, wherein the center facility monitoring/controlling subsystem includes a planning file storage unit that has stored a planning file in which a changed content and a changed time of the operational state of the facility to be controlled is scheduled, and the automatic operation means automatically changes the operational state of the facility to be controlled through the remote manipulation screen according to the planning file at a predetermined time.

8. The facility monitoring/controlling system according to claim 1, wherein the center facility monitoring/controlling subsystem includes operation target value setting means that sets an operation target value for not exceeding a contracted amount calculated from a value of an amount of contracted maximum receiving power of the facility to be controlled, and the automatic operation means remotely manipulates the on-site facility monitoring/controlling subsystem, stops the facility to be controlled or restricts functions thereof, and controls the operation so that consumed power due to the operation of the facility to be controlled is within the target value when the consumed power in the operational state of the facility to be controlled exceeds the target value as compared therewith.

9. The facility monitoring/controlling system according to claim 2, wherein the center facility monitoring/controlling subsystem includes an image synthesis function that generates an image signal to be drawn on the remote manipulation screen to synthesize it on the remote manipulation screen according to a manipulation content of the center input means indicated in the screen call procedure file.

10. The facility monitoring/controlling system according to claim 1, wherein the automatic data collection device includes a function that converts into coded data for logical operation a symbol image indicating the facility to be controlled displayed on the remote manipulation screen in a state of ON or OFF, to then collect the coded data.

11. The facility monitoring/controlling system according to claim 1, wherein the automatic data collection device includes a function that converts into coded data for four arithmetic operations a numerical image indicating the state of the facility to be controlled displayed on the remote manipulation screen to then collect the coded data.

12. The facility monitoring/controlling system according to claim 1, wherein
- the on-site facility monitoring/controlling subsystem includes a difference data extraction unit that analyzes a temporal change of image data forming the on-site manipulation screen to extract difference data, and a data conversion processing unit that performs data conversion processing using an analysis result that identifies change periodicity of the on-site manipulation screen and a moved position of a cursor image from the difference data, and transmits converted data after the data conversion by the network communication means,
- the center facility monitoring/controlling subsystem includes a manipulation screen reproduction/display processing unit that reproduces/displays the remote manipulation screen and the cursor image on the center display means based on the on-site manipulation screen data, and the converted data of the change periodicity of the image and the moved position of the cursor image transmitted from the on-site facility monitoring/controlling subsystem, whereby it becomes possible to reduce the amount of data transmission via the network.

13. A facility remote monitoring/controlling system wherein
in a facility monitoring/controlling system comprising:
- an on-site facility monitoring/controlling subsystem that includes on-site input means, on-site display means, and network communication means, and that controls operation of a facility to be controlled through an on-site manipulation screen in a state where an operational state of the facility to be controlled is visualized on the on-site display means; and
- a center facility monitoring/controlling subsystem that includes center input means, center display means, and network communication means, transmits manipulation instruction data to the on-site facility monitoring/controlling subsystem through the remote manipulation screen as well as performing data transmission/reception to/from the on-site facility monitoring/controlling subsystem and reproducing/displaying a remote manipulation screen with the same content as the on-site manipulation screen on the center display means, and that remotely controls the facility to be controlled,
- the on-site facility monitoring/controlling subsystem, the center facility monitoring/controlling subsystem, and the network communication means are configured to be in the same apparatus, and
- the center facility monitoring/controlling subsystem automatically remotely manipulates the on-site facility monitoring/controlling subsystem, and includes automatic operation means of the facility to be controlled, and wherein
- the center facility monitoring/controlling subsystem includes an automatic data collection device that performs image recognition of image information that is displayed on the remote manipulation screen to collect data, and automatically collects operation data of the facility to be controlled by the automatic data collection device based on the image displayed on the remote manipulation screen as well as displaying the operation data indicating the operational state of the facility to be controlled on the on-site manipulation screen of the on-site facility monitoring/controlling subsystem and on the remote manipulation screen of the center facility monitoring/controlling subsystem, by the automatic operation of the facility to be controlled by the automatic operation means through the remote manipulation screen.

14. A facility monitoring/controlling method for remotely monitoring/controlling a facilities to be controlled by using an on-site facility monitoring/controlling subsystem that includes on-site input means, on-site display means, and network communication means, and that controls operation of the facility to be controlled through an on-site manipulation screen in which an operational state of the facility to be controlled is visualized on the on-site display means; and a center facility monitoring/controlling subsystem that includes center input means, center display means, and network communication means, transmits manipulation instruction data to the on-site facility monitoring/controlling subsystem through a remote manipulation screen as well as performing data transmission/reception to/from the on-site facility monitoring/controlling subsystem and reproducing/displaying the remote manipulation screen with the same content as the on-site manipulation screen on the center display means, and that remotely controls the facility to be controlled, wherein
- a screen call procedure file indicating a transition procedure for calling each screen of the on-site manipulation screen and the remote manipulation screen is stored, the center input means is automatically manipulated automatically according to the screen call procedure file at a predetermined time, the on-site facility monitoring/controlling subsystem is communicated, the on-site facility monitoring/controlling subsystem is automatically remotely manipulated, and then the facility to be controlled is automatically operated, and wherein
- the center facility monitoring/controlling subsystem includes an automatic data collection device that performs image recognition of image information that is displayed on the remote manipulation screen to collect data, and automatically collects operation data of the facility to be controlled by the automatic data collection device based on the image displayed on the remote manipulation screen as well as displaying the operation data indicating the operational state of the facility to be controlled on the on-site manipulation screen of the on-site facility monitoring/controlling subsystem and on the remote manipulation screen of the center facility monitoring/controlling subsystem, by the automatic operation of the facility to be controlled by the automatic operation means through the remote manipulation screen.

15. A facility remote monitoring/controlling method wherein in a facility monitoring/controlling system comprising:

an on-site facility monitoring/controlling subsystem that includes on-site input means, on-site display means, and network communication means, and that controls operation of a facility to be controlled through an on-site manipulation screen in which an operational state of the facility to be controlled is visualized on the on-site display means; and a center facility monitoring/controlling subsystem that includes center input means, center display means, and network communication means, transmits manipulation instruction data to the on-site facility monitoring/controlling subsystem through a remote manipulation screen as well as performing data transmission/reception to/from the on-site facility monitoring/controlling subsystem and reproducing/displaying the remote manipulation screen with the same content as the on-site manipulation screen on the center display means, and that remotely controls the facility to be controlled;

the on-site facility monitoring/controlling subsystem, the center facility monitoring/controlling subsystem, and the network communication means are configured to be in the same apparatus, the center facility monitoring/controlling subsystem automatically remotely manipulates the on-site facility monitoring/controlling subsystem, and includes automatic operation means of the facility to be controlled, and wherein the center facility monitoring/controlling subsystem includes an automatic data collection device that performs image recognition of image information that is displayed on the remote manipulation screen to collect data, and automatically collects operation data of the facility to be controlled by the automatic data collection device based on the image displayed on the remote manipulation screen as well as displaying the operation data indicating the operational state of the facility to be controlled on the on-site manipulation screen of the on-site facility monitoring/controlling subsystem and on the remote manipulation screen of the center facility monitoring/controlling subsystem, by the automatic operation of the facility to be controlled by the automatic operation means through the remote manipulation screen.

16. The facility monitoring/controlling system according to claim 1, wherein the image recognition performed by the automatic data collection device on the screen analyzes at least one symbol of a graphical user interface of the screen, and extracts functional data that are represented by the at least one symbol.

17. A facility monitoring/controlling system comprising:

an on-site facility monitoring/controlling subsystem that includes on-site input means, on-site display means, and network communication means, and that controls operation of a facility to be controlled through an on-site manipulation screen in which an operational state of the facility to be controlled is visualized on the on-site display means; and a center facility monitoring/controlling subsystem that includes center input means, center display means, and network communication means, transmits manipulation instruction data to the on-site facility monitoring/controlling subsystem through a remote manipulation screen as well as performing data transmission/reception to/from the on-site facility monitoring/controlling subsystem and reproducing/displaying the remote manipulation screen with the same content as the on-site manipulation screen on the center display means, and that remotely controls the facility to be controlled; wherein the center facility monitoring/controlling subsystem automatically remotely manipulates the on-site facility monitoring/controlling subsystem, and includes automatic operation means of the facility to be controlled, the on-site facility monitoring/controlling subsystem includes a difference data extraction unit that analyzes a temporal change of image data forming the on-site manipulation screen to extract difference data, and a data conversion processing unit that performs data conversion processing using an analysis result that identifies change periodicity of the on-site manipulation screen and a moved position of a cursor image from the difference data, and transmits converted data after the data conversion by the network communication means, and the center facility monitoring/controlling subsystem includes a manipulation screen reproduction/display processing unit that reproduces/displays the remote manipulation screen and the cursor image on the center display means based on the on-site manipulation screen data, and the converted data of the change periodicity of the image and the moved position of the cursor image transmitted from the on-site facility monitoring/controlling subsystem, whereby it becomes possible to reduce the amount of data transmission via the network.

\* \* \* \* \*